United States Patent [19]

Fry et al.

[11] Patent Number: 5,710,676

[45] Date of Patent: Jan. 20, 1998

[54] PRE-FORMATTING OF A STORAGE MEDIA HAVING FIXED-SIZE PARTITIONS

[75] Inventors: Scott Milton Fry; Steven Douglas Johnson; Steven Bennett Wilson, all of Tucson, Ariz.

[73] Assignee: International Business Machines Corporation, Armonk, N.Y.

[21] Appl. No.: 614,435

[22] Filed: Mar. 12, 1996

[51] Int. Cl.[6] .................................................. G11B 15/18
[52] U.S. Cl. ..................... 360/72.1; 360/72.2; 360/72.3; 360/74.2; 360/49; 360/78.02; 395/404; 395/438
[58] Field of Search .................... 360/72.1, 72.2, 360/72.3, 74.1, 74.2, 74.4, 48, 49, 78.02; 395/404, 438

[56] References Cited

U.S. PATENT DOCUMENTS

| | | |
|---|---|---|
| 4,393,445 | 7/1983 | Milligan et al. .............. 360/72.2 X |
| 4,422,111 | 12/1983 | Moeller et al. .............. 360/72.1 |
| 4,541,019 | 9/1985 | Precourt .............. 360/48 X |
| 4,858,039 | 8/1989 | Mintzlaff .............. 360/72.2 |
| 5,485,321 | 1/1996 | Leonhardt et al. .............. 360/48 |
| 5,546,557 | 8/1996 | Allen et al. .............. 395/438 |

*Primary Examiner*—Aristotelis M. Psitos
*Assistant Examiner*—James L. Habermehl
*Attorney, Agent, or Firm*—Baker, Maxham, Jester & Meador

[57] ABSTRACT

A storage media for linear, serpentine recording is pre-formatted for data storage operations by recording partition format information in a single pass along the length of the storage media by recording partition format information for all storage media tracks at regular partition intervals defined by index locations alternately in both storage media directions before moving the storage media to the next partition interval. At each index location, partition markers are recorded in successive parallel tracks first in one media direction and then the other until markers are recorded across the entire width of the storage media. The steps of moving to a next partition index location, recording partition information in successive parallel tracks in first one direction and then the other, and moving to a next index location one partition length away, are repeated until all partitions of the storage media are pre-formatted.

53 Claims, 6 Drawing Sheets

PRE-FORMATTING OF A STORAGE MEDIA HAVING FIXED-SIZE PARTITIONS

BACKGROUND OF THE INVENTION

1. Field of the Invention

The present invention relates generally to storage media and, more particularly, to pre-formatting of storage media with fixed-size partitions.

2. Description of the Related Art

Computer tape storage devices record user data on lengths of recordable tape to thereby provide convenient, relatively economical storage of data. The tape generally consists of a length of substrate on which is deposited a coating that provides a recording media. The recordable magnetic tape is advanced past magnetic heads that record flux transitions, which represent data. Some tape storage devices record data with rotating heads in a helical scan pattern, across the width of the tape, but the vast majority of tape storage devices record data along the length of the tape, in a linear fashion, as the tape is moved past stationary heads.

When a typical linear tape storage device records data on tape, it first records a header block, or data format information, that specifies the configuration of the data to follow. The storage device then records user data onto a variable-size portion of tape whose length depends on the amount of user data recorded, and then records an end-of-data marker. Before the next succeeding block of user data is recorded, the storage device records another header block of format information. The end-of-data marker is then moved to the end of the user data. Thus, the end-of-data marker is constantly moved to the last recorded user data.

To access user data stored at the tape middle, the tape must be advanced relative to the recording heads from the beginning of the tape to the desired data block. As the tape is advanced, the header blocks are repeatedly read until the desired user data is reached. This positioning process can make data retrieval quite time consuming, as many storage tapes are hundreds of feet (or hundreds of meters) long. In addition, updating user data in place at its tape location is virtually impossible, because when data values change, they cannot be recorded with confidence that they will not extend over following data values that are not to be changed. Accessing data by reading successive header blocks can take an inordinate amount of time.

To reduce the time to access user data located in the middle and end portions of a tape, some linear tape storage devices divide the tape into fixed-sized recording areas called partitions and arrange the partitions into parallel tracks on the tape in a "serpentine" fashion. An area at the beginning of the tape is reserved to record a directory of the data that follows. The partitions thereby provide independently addressable storage regions. A serpentine tape storage pattern records data in a path that follows a first data track spanning the entire length of the tape in one direction, returns in the opposite tape direction in an adjacent parallel track, and then continues sweeping back and forth along the length of the tape in parallel tracks. The serpentine path defines a single storage path having a data area or logical length that might be many times the physical length of the tape. In this way, the logical middle of the tape storage path might be located at the physical beginning of the tape. This greatly reduces the access time for mid-tape partitions and also increases the total amount of data that can be stored on a tape.

Such tape storage devices include a device controller that manages the tape directory and partitioning so that data storage and retrieval into the partitions is transparent to a host computer, with which the storage device exchanges data. Thus, the host computer sends and receives data from the storage device, but has no involvement with the recording of that data on the storage media. If a user data block is updated and the new data values extend past the partition in which the prior values were stored, the device controller can stop the recording at the end of the partition and resume recording in a partition at another tape location. In this way, update-in-place data operations can be accommodated.

Partitions are generally separated by spacing areas called guard bands. The guard bands are recorded in a pre-formatting operation that is performed when a tape is initially prepared for use. After the tape is pre-formatted, user data can be recorded into the partitions. An initial portion of a guard band is a blank area that is erased of any data. Next, the guard band contains an extended inter-block gap (IBG) marker, followed by a beginning-of-partition (BOP) marker. The pre-formatting operation then records an end-of-data (EOD) marker that is moved along in the partition as data is recorded. The device controller stops recording data in a partition when an IBG marker is encountered. In this way, the guard bands ensure data integrity within the partitions. Unfortunately, the guard bands can require a relatively significant amount of the data storage surface area of the media.

Pre-formatting a serpentine storage tape so the proper information is stored in each guard band and the directory area is prepared can be quite time consuming. Typically, a tape is pre-formatted for later serpentine recording by moving the tape to a physical beginning-of-tape location and then carefully advancing the tape to the end of the first partition, where the appropriate partition IBG and BOP markers are recorded. The tape is then moved in the same direction to the end of the second partition, where the next partition markers are recorded. This continues in the initial path direction until the physical end of tape is reached. The tape is then moved in the opposite (rewind) direction and the partition markers are recorded in a parallel track at the next tape partition. Partition marker recording in the same track is repeated until the physical beginning of tape is reached, whereupon the direction of recording is again reversed and the partition markers are recorded in another parallel track. This process is repeated back and forth along the tape until all parallel tracks of the tape are marked and the tape is pre-formatted. For a tape of 1000-foot length, the time to pre-format a tape for serpentine recording can be on the order of twenty to thirty minutes, an amount of time that can be disruptive to typical data operations.

Some tape storage devices use servo tachometer marks that are recorded on the tape itself at regular intervals. These marks can be detected by the tape storage device read heads as the tape is advanced, thereby providing an indication of tape speed, relative device head location over a track, and tape partition location relative to the beginning of the tape. The size of the guard bands can be reduced if servo tachometer marks are used. The servo tachometer marks, to be accurately read by the device heads, can use up a relatively significant amount of the tape surface area and are difficult to implement in conjunction with serpentine recording.

From the discussion above, it should be apparent that there is a need for a way of pre-formatting a tape media with a reduced guard band size and in less time. The present invention satisfies this need.

SUMMARY OF THE INVENTION

In accordance with the present invention, a storage media for linear, serpentine data recording is pre-formatted for data storage operations by recording partition format information in a single pass along the length of the storage media by recording partition format information for all storage media tracks at regular partition intervals alternately in both storage media directions before moving the storage media to the next partition interval. In particular, partition markers at an initial index location are recorded in successive parallel tracks first in one media direction and then the other until markers are recorded across the entire width of the media. The storage media is then positioned at a second index location a fixed size partition length relative to the first index location and partition format information is recorded in successive parallel tracks relative to the second index location, first in one media direction and then the other, until markers are recorded across the entire width of the media. The steps of moving to a next partition location, recording partition information in successive parallel tracks in first one direction and then the other, and moving to a next index location one partition length away, are repeated until all partitions of the storage media are pre-formatted. In this way, minimal storage media movement is required for the operation, because the storage media is substantially in the correct position for recording in a subsequent track when recording of the format information for the preceding track is completed, except for moving from the preceding track to the parallel track.

Other features and advantages of the present invention should be apparent from the following description of the preferred embodiment, which illustrates, by way of example, the principles of the invention.

DESCRIPTION OF THE PREFERRED EMBODIMENT

Storage Media

Figure 1:
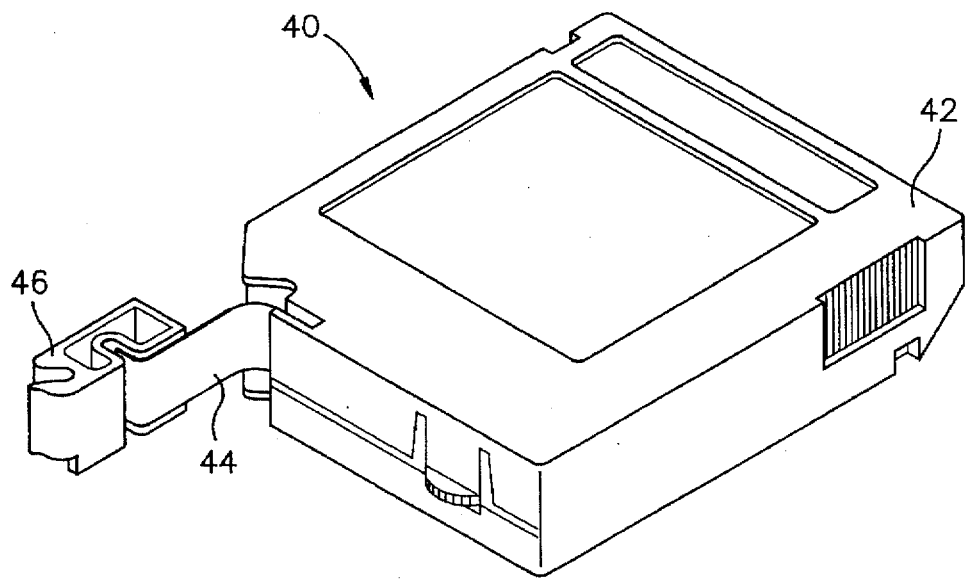
FIG. 1 is a view of a recording media tape cartridge constructed in accordance with the present invention.
Figure 2:
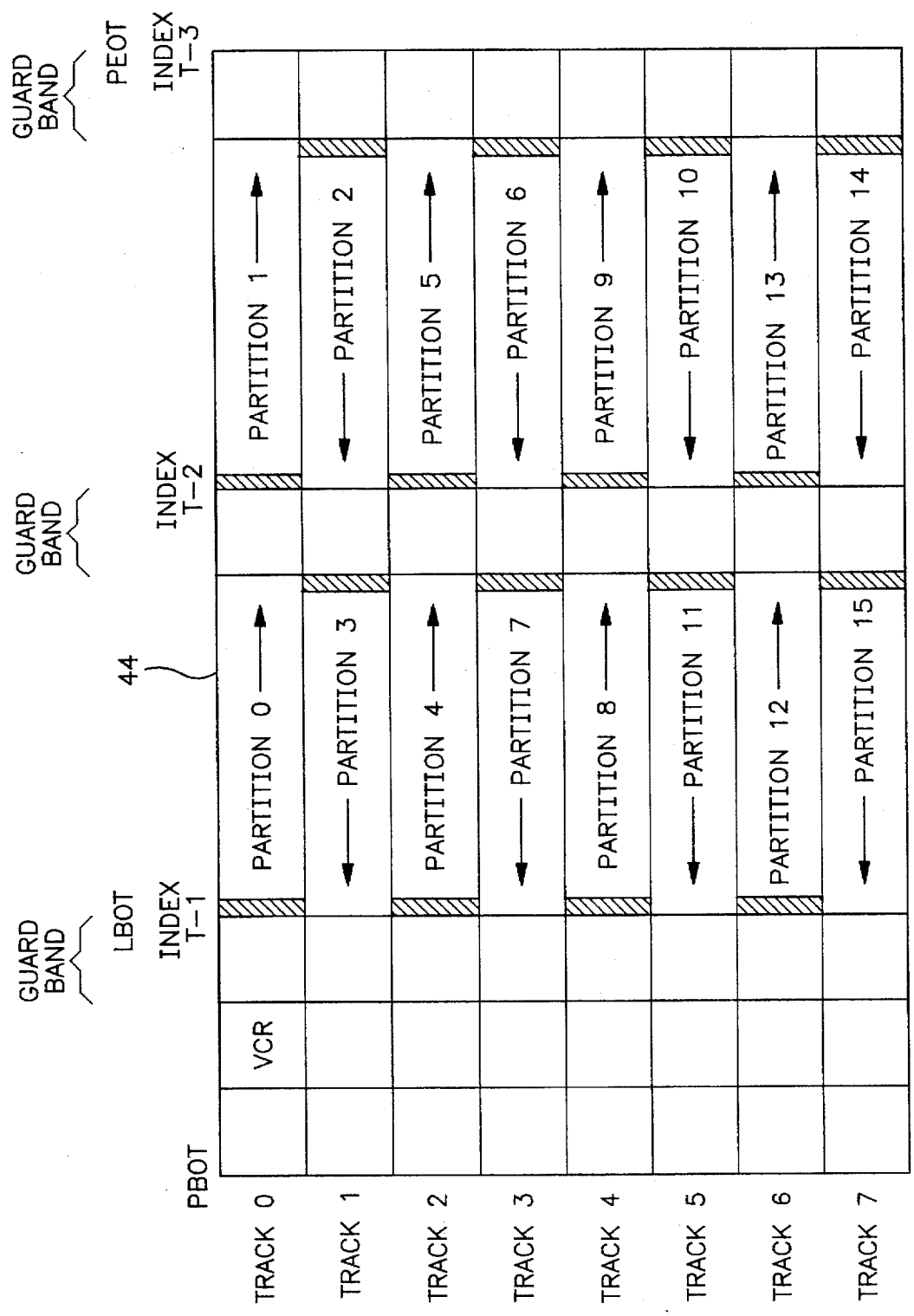
FIG. 2 is a representation of a portion of the recording media contained in the tape cartridge illustrated in FIG. 1.

FIG. 1 shows a data cartridge 40 constructed in accordance with the present invention. The data cartridge can comprise, for example, a Model 3590 tape cartridge produced by the International Business Machines Corporation (IBM Corporation) intended for use with the Model 3590 tape storage subsystem by IBM Corporation. The data cartridge 40 includes an outer shell 42 that contains a storage media comprising a single-reel tape 44 having a leader block 46 attached at one end. FIG. 2 is a representation of the tape 44 that shows the data arrangement. In accordance with the invention, the tape is pre-formatted into eight parallel serpentine tracks having independently addressable storage regions that are separated by partition markers recorded in the serpentine tracks such that the partition markers at a first index location are recorded first in one tape direction and then in the opposite direction, alternating track by track, until partition markers are recorded across the entire width of the tape, and then the tape is moved to a succeeding index location, where partition marker recording is repeated. Recording the partition markers relative to the same index location, across the width of the tape, more precisely controls the position of each partition and permits the guard band size to be significantly reduced. In this way, partitions on the serpentine tape are pre-formatted with a reduced guard band size and in less time.

In FIG. 2, the physical beginning of the tape 44 (near the leader block shown in FIG. 1) is indicated by "PBOT" and the physical end of the tape is indicated by "PEOT". Thus, a reference to the "forward tape direction" will be understood to mean the direction moving from the beginning of the tape to the end of the tape. In the preferred embodiment, the tape is 0.5 inch (2.5 cm) wide, 1000 feet (300 meters) long, and has the capacity to store approximately ten GB of un-compacted data. The eight serpentine tracks of the tape 44 are designated Track 0, Track 1, and so forth through Track 7. Beginning-of-partition (BOP) markers are indicated in FIG. 2 by diagonally-striped vertical bars in each track. The partitions are numbered consecutively in the serpentine path, beginning with the first partition of Track 0, which is labelled Partition 0, and ending with the last partition of Track 7, labelled Partition 15. It should be understood that the number of partitions on a tape cartridge can be much greater than the sixteen partitions shown in FIG. 2 or can be fewer, as desired.

A volume control region (VCR) is recorded in the first serpentine track a distance after the PBOT and contains tape format information, user data identification information, and the like. The exact contents of the VCR (and therefore its size) and the distance from the PBOT to the beginning of the VCR depend on the tape storage system with which the data cartridge 40 is being used. The VCR defines the logical beginning of tape (LBOT), where user data recording begins. The partition markers are recorded in guard band regions between partitions of the serpentine tracks. For example, guard bands are located between Partition 0 and Partition 1 of Track 0, and between Partition 2 and Partition 3 of Track 1, between Partition 13 of Track 6 Partition 14 of Track 7, and between any other two partitions of the tape.

In the preferred embodiment, when the data cartridge 40 is to be pre-formatted, the tape 44 is first advanced to the PEOT and then the partition markers are recorded in alternating tracks. After the partition markers at the PEOT are recorded, the tape is moved to successive index locations such that, at each index location, the partition markers are recorded in opposite directions, alternating track by track. When the LBOT is reached, the partition markers are again recorded in alternating tracks. Thus, the partition markers are recorded first at one end of the tape, then at successive intermediate index locations, and then at the other end of the tape.

More particularly, after the tape is initially moved relative to the read/write heads to the PEOT, the tape must be moved in the rewind direction (from the PEOT toward the PBOT) to do any recording. Thus, the tape is properly positioned for recording in the tape rewind direction. Therefore, partition markers are recorded relative to the PEOT index location in alternating tracks. For example, with reference to FIG. 2, the partition marker for the beginning of Partition 2 in Track 1 would be recorded, then the partition marker for Partition 6 in Track 3 would be recorded, then the partition marker for Partition 10 in Track 5 would be recorded, and finally the partition marker for Partition 14 in Track 7 would be recorded. The partition marker recording at the PEOT index location would then be complete and the tape would be moved to the next index location in the tape rewind direction, indicated in FIG. 2 as "Index T-2".

At intermediate tape index locations such as T-2, partition markers must be recorded in each of the parallel tracks. After recording a partition marker of a track in the first tape direction, recording in the next parallel track takes place in the second, opposite tape direction. Therefore, to reduce the amount of tape movement, the preferred embodiment records a partition marker for a track in the first tape direction, then moves the read/write head to a parallel track without moving the tape longitudinally, records a partition marker for the parallel track in the second, opposite tape direction, and continues with this process, moving the read/write heads at the conclusion of each partition marker recording to a parallel track without moving the tape, recording a partition marker in the opposite direction, continuing across the width of the tape, until partition markers have been recorded in each of the parallel tracks. The tape is then moved to a next successive tape index location, where the process is repeated. Eventually, the LBOT is reached, where partition marker recording again takes place only in alternate tracks. This time, the partition markers will be recorded in the second (advance) tape direction. The tape index locations generally will be recorded at regularly spaced intervals along the longitudinal length of the tape.

For example, after the tape illustrated in FIG. 2 is advanced to the T-2 index location, the partition marker for Partition 3 in Track 1 is recorded so that recording can take place without changing tape direction. At the completion of Partition 3 recording, the tape is positioned substantially in the proper location, relative to the tape drive read/write heads, for recording a partition marker in a parallel track in the opposite direction without requiring any longitudinal (back and forth) tape movement. Therefore, the read/write heads are moved and the partition marker for Partition 5 in Track 2 is recorded next.

After Partition 5 recording, the tape is positioned substantially in the proper location for Partition 7 recording, which is completed next. After the Partition 7 recording, the recording for Partition 9 takes place, followed by Partition 11, Partition 13, Partition 15, and then Partition 1. The tape 24 would then be moved to the next index location. In FIG. 2, the next location is T-1, but it should be understood that the next index location also could be another intermediate tape location. It also should be understood that other sequences of track to track partition recording could be followed, alternating tape recording direction after each track.

When the tape is moved to the LBOT, T-1 index location, partition marker recording takes place, for example, in a sequence such as Partition 0, Partition 4, Partition 8, and then Partition 12. The recording at the LBOT index location takes place in the tape advance direction. This completes partition marker recording for all of the partitions in all of the serpentine tracks, and therefore tape pre-formatting would be completed.

The process described above minimizes the time spent at each index location recording the partition markers. In addition, time spent moving the tape from index location to index location is minimized, because tape movement between index locations can take place at high transport speeds rather than at slower read/write speeds. A typical tape read/write speed, for example, is 2.0 m/sec, while tape transport is typically achieved at 5.0 m/sec.

Data Storage Subsystem

Figure 3:
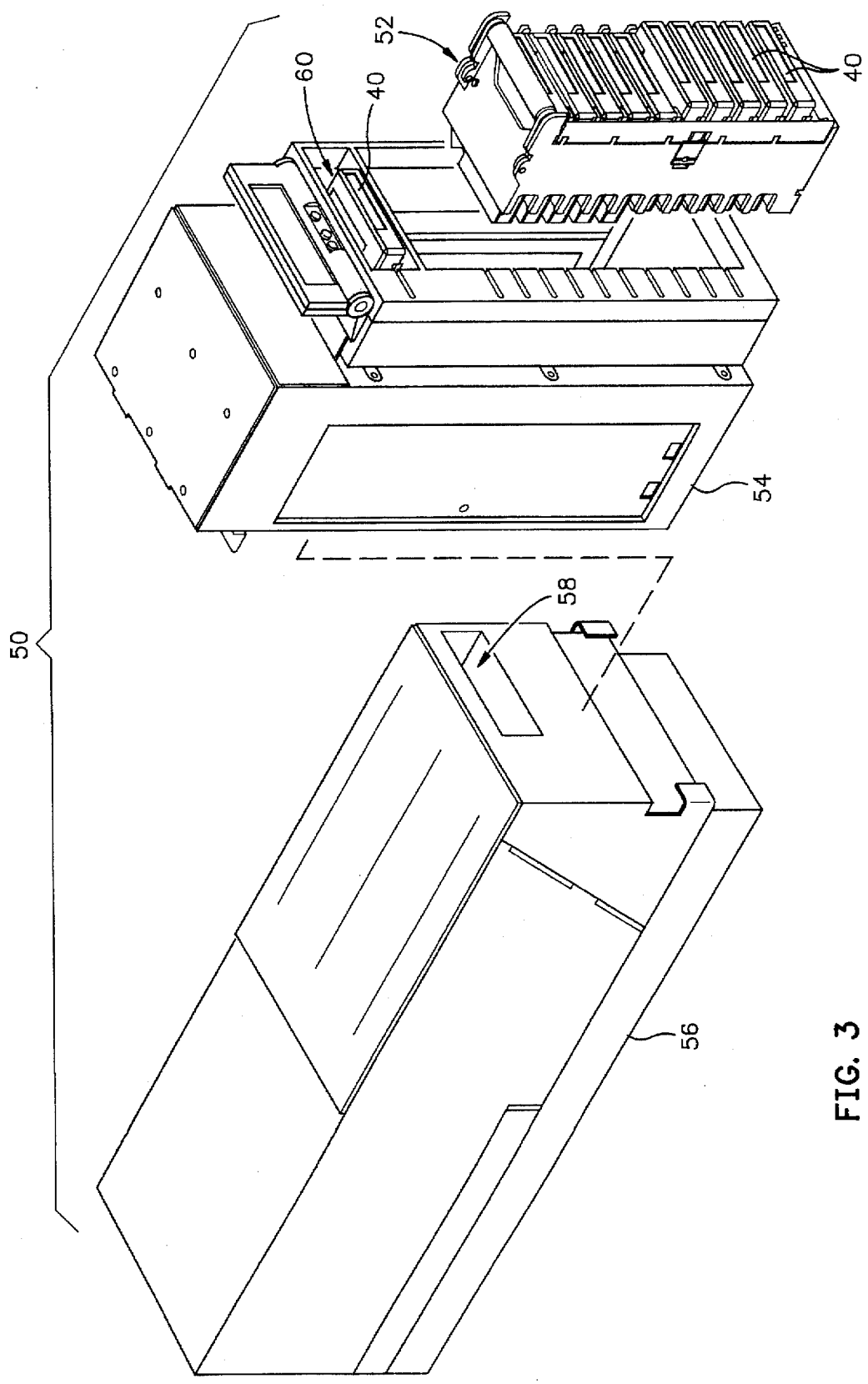
FIG. 3 is a view of a recording subsystem that utilizes the tape cartridge illustrated in FIG. 1.

FIG. 3 shows an automatic data storage subsystem 50 that is used with the data cartridge 40. In FIG. 3, multiple cartridges have been placed in a cartridge magazine 52 for mating with a loader unit 54, which is attached to a drive unit 56. The drive unit may comprise, for example, the aforementioned Model 3590 unit from IBM Corporation, and contains a tape transport mechanism and read/write heads. The loader unit physically transfers cartridges to the drive unit and can accept cartridges from the magazine 52, from an automated library, from direct insertion by a user, or from other suitable cartridge storage facilities. When the magazine 52 is mated with the automatic cartridge loader 54, cartridges are removed from the magazine, transported to a receiving port 58 of the drive unit, and processed. After processing, the cartridges are returned to the magazine. At any time during such operations, a cartridge can be manually inserted into a priority slot 60 and transported to the drive unit 56 for processing.

Tape Drive Unit and Tape Path

Figure 4:
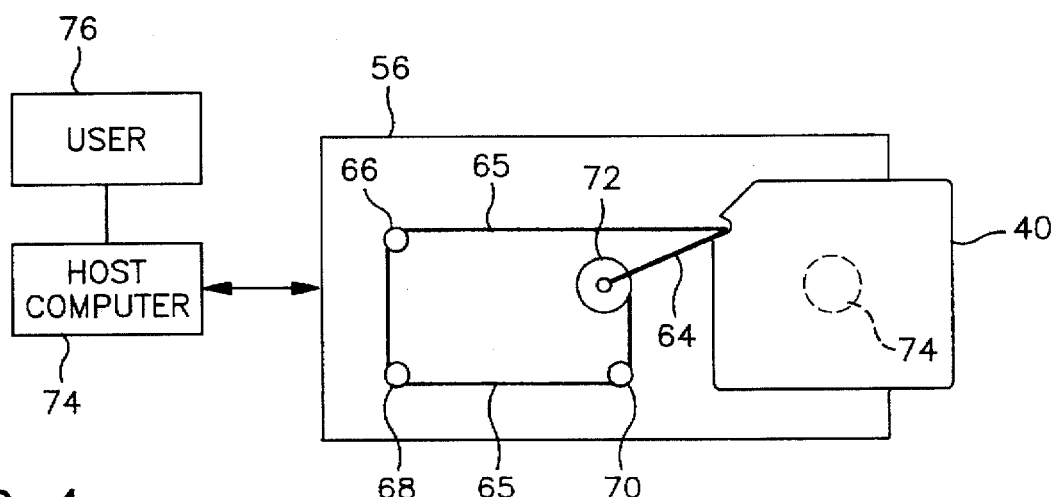
FIG. 4 is a representation of the storage device illustrated in FIG. 3 connected to a host computer.

FIG. 4 shows the drive unit 56 with a top panel removed to reveal a tape cartridge 40 inserted into the drive unit for processing. In the preferred embodiment of the Model 3590, a loading arm 64 pulls the tape leader block 46 (FIG. 1) out from the cartridge and threads it through a tape path 65 that winds around several pinions 66, 68, 70 before coupling the leader block to a take-up reel 72 of the drive unit. Thus, the recording tape media is wound around a supply reel 74 of the data cartridge 40 and is advanced onto the take-up reel 72 of the tape drive 56. User data is stored and retrieved between the tape drive and a host computer 74, through which a user 76 provides storage and retrieval commands.

As each reel 72, 74 rotates, the reel moves a tachometer. The tachometers are used to keep track of the amount of tape on the respective reels. For example, when the tape leader block is wound through the tape path 65, the initial respective tachometer counts are initialized. As the reels rotate and tape is moved from the cartridge supply reel 74 to the drive unit take-up reel 72, the relative number of rotations of the supply reel for each rotation of the take-up reel will increase. The changing ratio of reel rotations is known from the length of the tape in the cartridge, which is known from data recorded in the VCR.

In this way, the drive unit can periodically check the changing relative reel rotation count and determine the approximate amount of tape wound onto each reel and thereby determine when the physical end of tape (PEOT) is approaching. For example, during high-speed tape operations when the tape is not read while being moved, the rotation count can be checked so that, as the PEOT approaches, tape speed can be reduced and more precise tape control (such as reading the tape to find a recorded end of tape indicator) can be instituted.

The partition markers generally will be recorded at uniformly spaced intervals calculated by dividing the length of the tape by the desired number of intervals, which can be retrieved from the VCR or can be a predetermined interval. The tape preferably is moved from index location to index location by checking the relative tachometer reel counts.

Storage Subsystem Components

Figure 5:
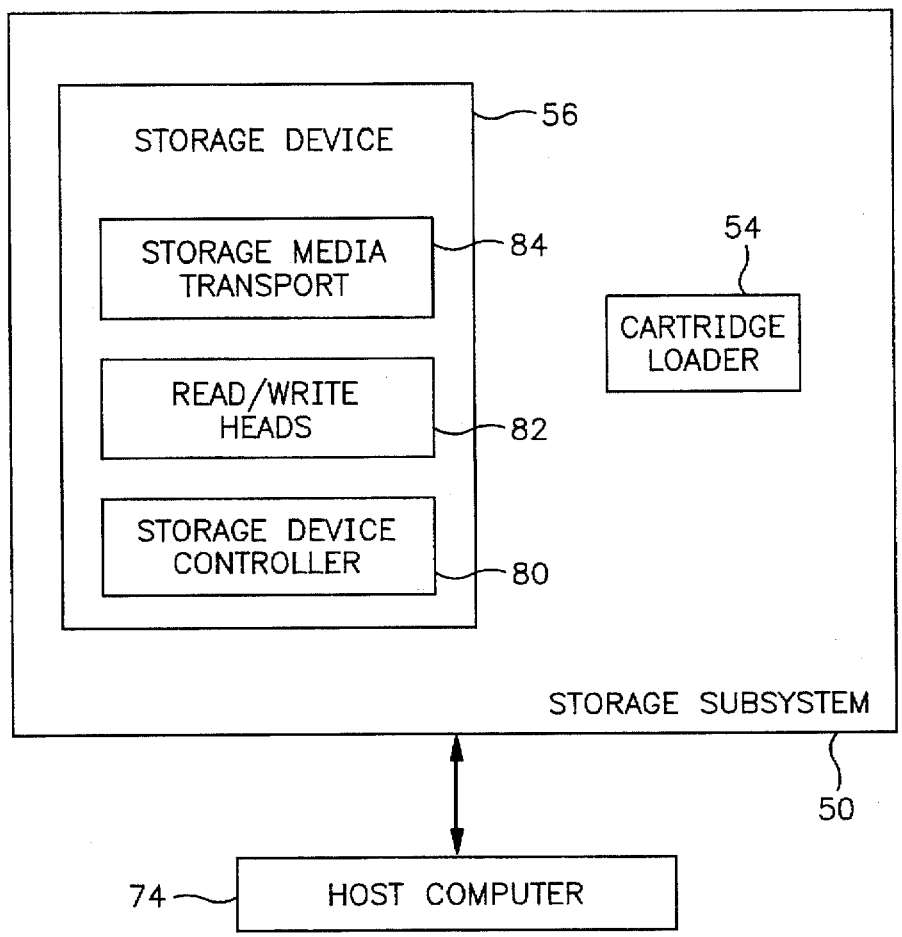
FIG. 5 is a block diagram that shows the construction of the apparatus illustrated in FIG. 4.

FIG. 5 is a block diagram of the storage subsystem 50 showing its connection to the host computer 74. The host computer can comprise any one of a variety of computers, including the "RS6000" computer, "AS400" workstation, or "IBM PC" personal computers by IBM Corporation, or mainframe computers. The tape drive unit 56 comprises a storage device that includes a controller 80, heads 82 that read and write data from the storage media, and a storage media transport 84, which moves the storage media relative to the heads. The optional cartridge loader 54 completes the storage subsystem.

Figure 6:
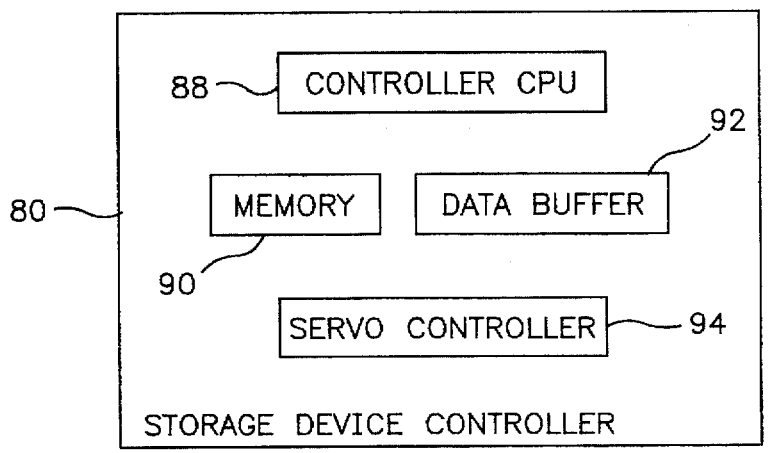
FIG. 6 is a block diagram of the storage device controller illustrated in FIG. 5.

FIG. 6 is a block diagram of the storage device controller 80 illustrated in FIG. 5. The controller 80 includes a central processing unit (CPU) 88, such as the Model "i960" microprocessor available from Intel Corporation, Santa Clara, Calif. The controller also includes a high-speed, random access memory 90, a data buffer 92, and a servo controller 94 for maintaining the position of the user data tracks over the read/write/erase heads over the user data tracks. As noted above, the preferred embodiment includes sixteen data tracks within each serpentine track. Thus, the tape 44 includes servo information recorded for maintaining the head position over a desired one of the data tracks. The data buffer 92 can be used to temporarily store user data and to maintain operational data, such as the respective reel tachometer counts described above.

Tape Partition Details

Figure 7:
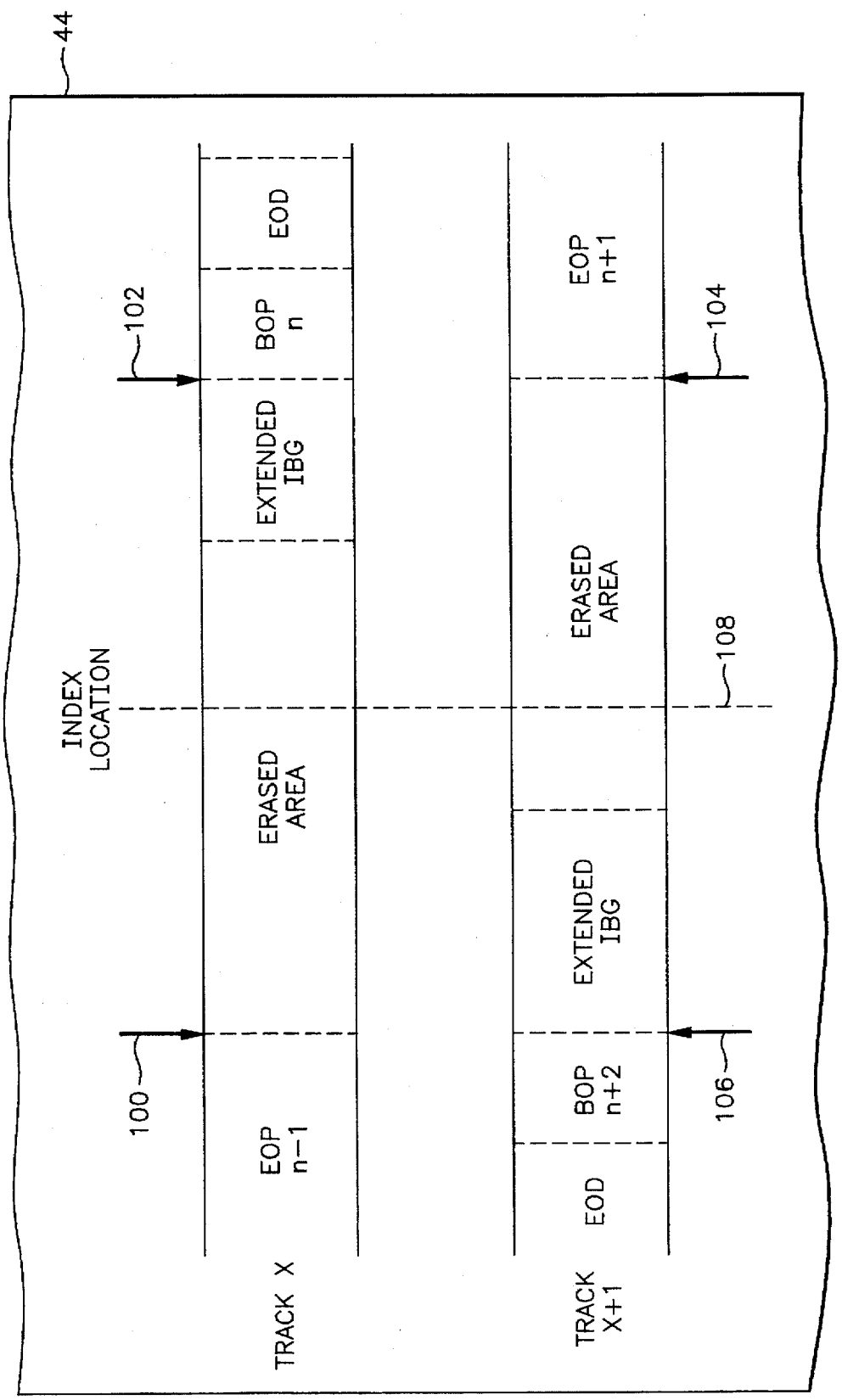
FIG. 7 is a detail representation of a portion of the recording media illustrated in FIG. 2.

FIG. 7 shows details of the separation between partitions in two adjacent serpentine partition tracks. No marker is necessarily recorded to delineate the end of a Partition (n−1) in Track x, but the end of that partition is indicated in FIG. 7 by "EOP n−1". The beginning of the partition in Track x that follows, Partition (n), is indicated by "BOP n", where a partition marker is recorded. For purposes of illustration, it will be assumed that the tape advance direction is from Partition (n−1) to Partition (n) and the serpentine path will be described as if it contained a single user data track. Thus, user data recorded in Track x is recorded in the tape advance direction. An end-of-data marker (EOD) is recorded in the partition and is moved forward as user data is recorded.

The top arrows 100, 102 indicate the boundaries of the guard band in Track x. Similarly located bottom arrows 104, 106 mark the boundaries of the corresponding guard band in an adjacent parallel track, Track x+1. Because Track x+1 is an adjacent track, it is recorded in the tape rewind direction. The guard band boundaries 100, 102 in one track will typically be aligned with the guard band boundaries 104, 106 of an adjacent track and with all parallel tracks across the width of the tape, but it is not critical to the operation of the tape drive unit for the guard band boundaries to be precisely aligned. Thus, the guard bands in FIG. 7 are illustrated relative to a dotted line 108 marking an index location to indicate that, in general, the tape is positioned relative to an index location and the partition marker in a first track is then recorded. Partition marker recording then takes place in the remaining parallel tracks without again positioning the tape relative to the index location.

Thus, it should be understood that the storage media drive unit need make no reference again to tachometer count or otherwise determine the index location during the pre-formatting process after each index location positioning. That is, partition marking takes place in alternating tape directions, back and forth as the partition recording in successive tracks is finished, without regard to the initial index location after the initial positioning at each tape index location. This increases the efficiency of tape pre-formatting.

FIG. 7 indicates that the guard band in Track x begins with an erased area where no data is recorded, followed by an area having an extended inter-block gap (IBG) marker. The extended IBG marker provides a synchronization marker that can be detected and used by the device controller for more accurate reading from the tape. After the IBG marker, the BOP for Partition n is recorded. Similarly, the guard band in Track x+1 follows Partition (n+1) and begins with an erased area, then continues with the extended IBG for Partition (n+2), and then with the BOP for Partition (n+2).

Flow Diagram of the Pre-Formatting Process

Figure 8:
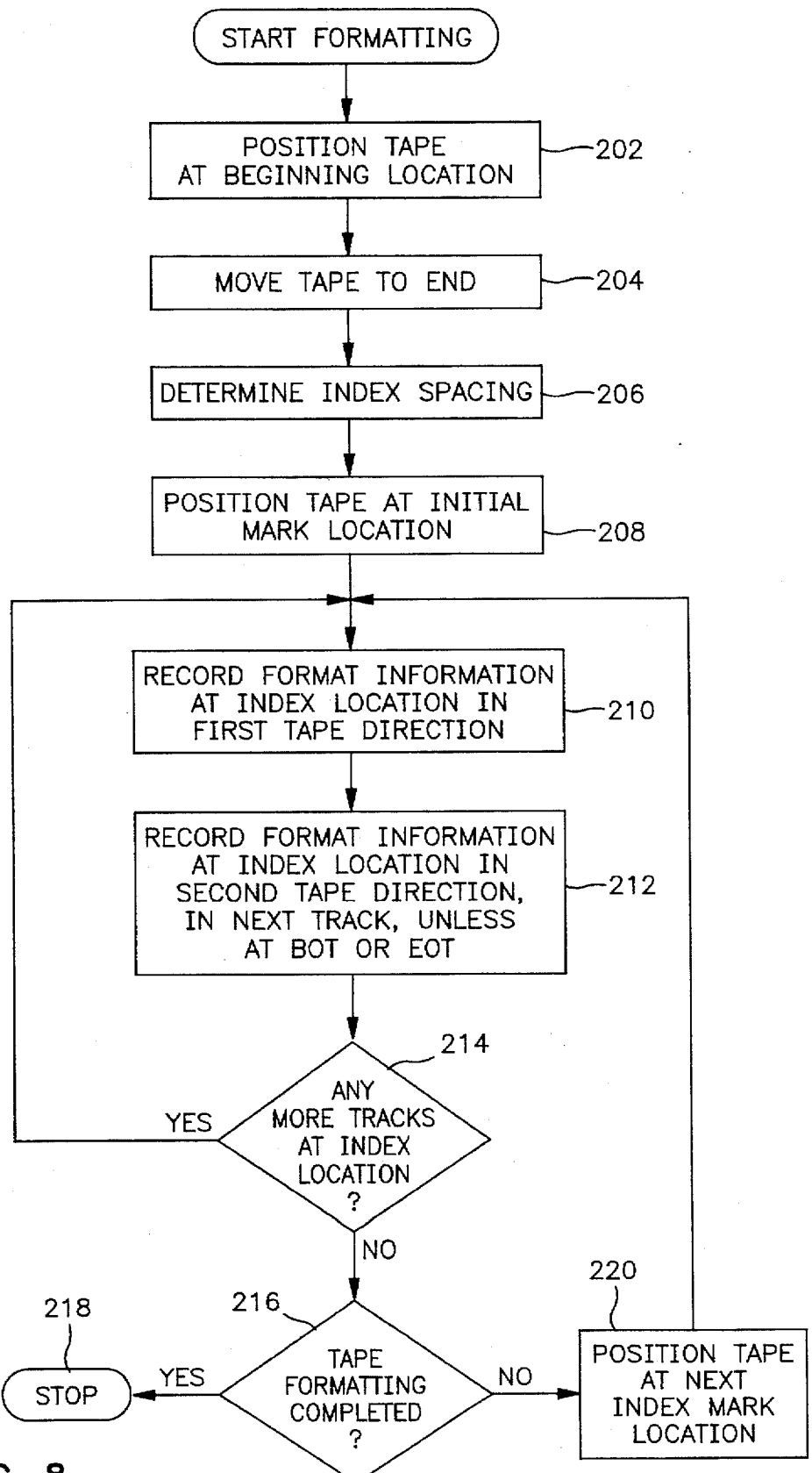
FIG. 8 is a flow diagram that illustrates the processing steps performed in producing the recording media illustrated in FIG. 2 and FIG. 7.

FIG. 8 is a flow diagram that illustrates the processing steps performed by the drive unit controller in performing tape pre-formatting. The processing steps can be embodied in circuitry or encoded in programming instructions of the microprocessor illustrated in the block diagram of FIG. 6. In the first pre-formatting step, represented by the FIG. 8 flow diagram box numbered 202, the controller positions the tape at a beginning location. That is, the tape is positioned near the leader block and the tachometer counts of the respective tape reels are initialized. Next, the preferred controller embodiment moves the tape to its physical end. This step is represented by the flow diagram box numbered 204. As the tape is moved to the PEOT, the controller maintains the tachometer counts of the respective reels. When the tachometer count equals the predetermined length of the tape, the tape can be stopped and pre-formatting begun, or high-speed transport of the tape can be halted and tape reading started until a physical marker is encountered.

Maintaining the tachometer count permits the controller to easily determine the length of tape on each reel. Moreover, moving the tape to the PEOT and determining the length permits variations in tape length to be taken into account. For example, the ambient temperature can affect tape length. The torque applied by the tape transport motors also can affect the tape length. Thus, maintaining the tachometer count as an indicator of when the tape is wound to the PEOT provides a very precise measure of the tape length and accommodates variations in tape cartridges and tape drive subsystems at the time of pre-formatting.

In the next processing step, represented by the flow diagram box numbered 206, the drive controller determines the partition spacing. The drive controller determines the partition spacing by receiving a desired number of partitions and dividing the measured tape length accordingly to provide regularly spaced index location intervals. Information such as the desired number of partitions and number of serpentine tracks is preferably recorded in the VCR region and read by the device controller. After the partition spacing is determined, the flow diagram box numbered 208 indicates that the drive controller next moves the tape to a beginning index location for recording partition marker information in a first tape direction. As noted above, in the preferred embodiment, the beginning index location is the PEOT.

If the tape is positioned at an intermediate index location, then the drive controller records partition marks in the respective serpentine tracks in alternating directions. Thus, the flow diagram box numbered 210 indicates that partition information is recorded at the first index location in a first tape direction and the flow diagram box numbered 212 indicates that partition information is recorded at the index location in a second tape direction, in a next parallel track, unless the tape is at the EOT or BOT. As described above, partition marker recording at the PEOT and at the LBOT takes place only in alternating tracks, in one tape direction. Thus, the flow diagram processing notes the exception to alternate direction recording at the EOT and BOT.

More particularly, at intermediate tape locations, the preferred embodiment records partition information in a first tape direction. When recording in the first tape direction is completed, the tape is positioned substantially in the correct relative tape location to begin recording partition format information in the opposite, second tape direction in a parallel track. Therefore, the drive controller moves the recording heads to a parallel track for recording in the opposite direction. Thus, in the preferred embodiment, the drive controller moves the recording heads to an adjacent track and records in the second tape direction. This operation is represented in FIG. 8 by the flow diagram box numbered 212.

After the partition format information is recorded in the next parallel track, the drive controller checks to determine if any additional serpentine tracks remain at the index location without partition format information. The checking operation is represented by the decision box numbered 214. If parallel tracks remain to be recorded at the index location, an affirmative response at the decision box, then processing returns to the flow diagram box numbered 210, where partition format information is recorded at the index location in the first tape direction. Recording then takes place in the opposite direction, in a parallel track, at the flow diagram box numbered 212. The process then repeats at the decision box numbered 214 until partition format recording has taken place in all the serpentine tracks at the index location.

When all tracks at the index location across the width of the tape have been recorded with partition format information, the outcome of the decision box numbered 214 is negative and processing moves to the decision box numbered 216. At the decision box numbered 216, the device controller determines if the tape has been completely pre-formatted. Completion ends the pre-formatting process at the stop box numbered 218. Because the preferred embodiment begins pre-formatting at the PEOT, tape pre-formatting will be complete when the last partition marker at the tape beginning (LBOT) is recorded. If tape pre-formatting is not completed, a negative outcome at the decision box numbered 216, then processing moves to the flow diagram box numbered 220.

At the flow diagram box numbered 220, the device controller moves the tape to position it at the next index mark location. In the preferred embodiment, the index mark locations do not refer to actual marks recorded on the tape. Rather, the index mark locations refer to the partition spacing determined by the drive controller after measuring the length of the tape in the cartridge. More particularly, after the drive controller completes partition marking at the PEOT, the drive controller moves the tape in the tape advance direction for a distance equal to the desired partition spacing. This places the tape at the next (second) tape index location. The drive controller keeps track of the tape distance moved by maintaining the aforementioned tachometer counts of the respective tape reels. The drive controller preferably moves the tape from index location to index location at high transport speeds, maintaining reel tachometer counts to determine interval stopping points.

It should be noted that the desired partition spacing will determine the distance of the partitions from approximately the middle of one guard band region to the middle of the next guard band region. Thus, the drive controller must move the tape a distance equal to the desired partition spacing less a distance equal to one-half the guard band length. More particularly, in the tape positioning step represented by the flow diagram box numbered 220, the drive controller will move the tape so the tape will stop relative to the recording heads so that the EOP marker for the preceding partition can be recorded and then the erased area and the extended IBG of the next partition can be recorded. When the tape is in the correct position for partition recording at the next index location, the conclusion of box 220 processing, the drive controller processing returns to the flow diagram box numbered 210. Tape pre-format processing continues in this manner until the cartridge is completely pre-formatted.

The present invention has been described above in terms of a presently preferred embodiment so that an understanding of the present invention can be conveyed. There are, however, many configurations for storage media not specifically described herein but with which the present invention is applicable. The present invention should therefore not be seen as limited to the particular embodiment described herein, but rather, it should be understood that the present invention has wide applicability with respect to storage media generally. For example, the present invention can be applied to capacitive and optical transition sensing storage systems. All modifications, variations, or equivalent arrangements that are within the scope of the attached claims should therefore be considered to be within the scope of the invention.

We claim:

1. A method of recording partition format information on a storage media, the method comprising the steps of:

recording partition format information in a first storage media track in a first media direction beginning at an index location of the storage media;

recording partition information in a second storage media track, parallel to the first storage media track, in a second media direction opposite that of the first media direction;

repeating the steps of recording in the first media direction and then recording in the second media direction in successive parallel tracks across the width of the storage media; and recording partition format information at the next index location of the storage media in alternating media directions within successive parallel tracks across the width of the storage media.

2. A method as defined in claim 1, wherein the first and second media recording directions extend along the length of the storage media.

3. A method as defined in claim 1, wherein the index locations are at regularly spaced intervals along the length of the storage media.

4. A method as defined in claim 1, wherein the storage media is a linear recording tape.

5. A method of recording partition format information at index locations on a storage media, the method comprising the steps of:

positioning the storage media at a first index location relative to a recording head;

recording partition format information in a predetermined number of parallel tracks relative to the first index location of the storage media by alternately recording the partition format information in a first recording direction of a storage media track and then in an opposite, second recording direction in a parallel storage media track;

moving the storage media in a first storage media direction to a next index location relative to the first index location;

repeating the steps of recording and moving until a predetermined extent of the storage media is recorded with partition format information.

6. A method as defined in claim 5, wherein the step of recording includes moving the storage media at a recording speed past the recording head; and the step of moving includes moving the storage media relative to the recording head at a transport speed greater than the recording speed.

7. A method as defined in claim 5, wherein the index locations are at regularly spaced intervals along the length of the storage media.

8. A method as defined in claim 5, wherein the recording direction and the first storage media direction are parallel.

9. A method as defined in claim 5, wherein the first index location comprises an end of media location, and the step of positioning comprises the steps of:
   initializing a position indicator that is moved a predetermined distance when the storage media is moved;
   maintaining a count of the position indicator movement as the storage media is moved from a beginning media location to the end of media location;
   determining the length of the storage media from the beginning media location to the end of media location in accordance with the count of the position indicator movement.

10. A method as defined in claim 9, wherein the step of moving the storage media comprises determining an index location interval in accordance with the determined storage media length and moving the storage media in the first storage media direction a distance equal to the index location interval.

11. A method of recording partition format information on a linear storage media in a plurality of parallel tracks that extend lengthwise along the longitudinal dimension of the storage media, the method comprising the steps of:
   determining a storage media length from a first media index location to a second media index location relative to a recording head;
   positioning the second media index location at the recording head;
   recording format information in alternate parallel tracks relative to the second storage media index location in a first storage media direction;
   positioning the storage media toward the first media index location at the new media index location relative to the second media index location;
   recording format information in successive parallel tracks relative to the new media index location by alternately recording in the first storage media direction and then in a second storage media direction opposite that of the first storage media direction, in a parallel track, across the width of the storage media;
   repeating the steps of positioning the storage media and recording format information alternatingly in the first storage media direction and then in the second storage media direction until the storage media is positioned at the first media index location; and
   recording format information in alternate parallel tracks relative to the first storage media index location in the second storage media direction.

12. A method as defined in claim 11, wherein the step of positioning the storage media toward the first media index location comprises determining an index location interval in accordance with the determined storage media length and positioning the storage media closer to the first media index location by the index location interval.

13. A method as defined in claim 11, wherein the step of determining storage media length comprises the steps of:
   initializing a rotational position indication of a hub on which the storage media is wound;
   maintaining the rotational position indication as the storage media is moved from the first media index location to the second media index location;
   determining the length of the storage media from the first media index location to the second media index location in accordance with the rotational position indication.

14. A method as defined in claim 13, wherein the step of positioning the storage media toward the first media index location comprises the steps of:
   determining an index location interval in accordance with the determined storage media length; and
   moving the storage media closer to the first media index location until the rotational position indication increases by the amount of the index location interval.

15. A method as defined in claim 11, wherein the steps of positioning comprise moving the storage media at a high speed greater than a recording speed at which the storage media is moved during recording.

16. A method as defined in claim 11, wherein the storage media comprises a tape storage device.

17. A storage device having a linear storage media on which partition format information is recorded in a plurality of parallel tracks that extend lengthwise along the longitudinal dimension of the storage media in a process comprising the steps of:
   determining a storage media length from a first media index location to a second media index location relative to a recording head;
   positioning the second media index location at the recording head;
   recording format information in alternate parallel tracks relative to the second storage media index location in a first storage media direction;
   positioning the storage media toward the first media index location at a new media index location relative to the second media index location;
   recording format information in successive parallel tracks relative to the new media index location by alternately recording in the first storage media direction and then in a second storage media direction opposite that of the first storage media direction, in a parallel track, across the width of the storage media;
   repeating the steps of positioning the storage media and recording format information alternatingly in the first storage media direction and then in the second storage media direction until the storage media is positioned at the first media index location; and
   recording format information in alternate parallel tracks relative to the first storage media index location in the second storage media direction.

18. A storage device as defined in claim 17, wherein the step of positioning the storage media toward the first media index location comprises determining an index location interval in accordance with the determined storage media length and positioning the storage media closer to the first media index location by the index location interval.

19. A storage device as defined in claim 17, wherein the step of determining storage media length comprises the steps of:
   initializing a rotational position indication of a hub on which the storage media is wound;
   maintaining the rotational position indication as the storage media is moved from the first media index location to the second media index location;
   determining the length of the storage media from the first media index location to the second media index location in accordance with the rotational position indication.

20. A storage device as defined in claim 19, wherein the step of positioning the storage media toward the first media index location comprises the steps of:
    determining an index location interval in accordance with the determined storage media length; and
    moving the storage media closer to the first media index location until the rotational position indication increases by the amount of the index location interval.

21. A storage device as defined in claim 19, wherein the steps of positioning comprise moving the storage media at a high speed greater than a recording speed at which the storage media is moved during recording.

22. A drive unit controller comprising:
    a controller central processing unit; and
    a servo controller that moves drive unit heads relative to a storage media;
    wherein the controller central processing unit is programmed to control the servo controller and perform method steps for recording partition format information on a storage media, the method steps comprising:
    recording partition format information in a first storage media track in a first media direction beginning at an index location of the storage media,
    recording partition information in a second storage media track, parallel to the first storage media track, in a second media direction opposite that of the first media direction,
    repeating the steps of recording in the first media direction and then recording in the second media direction in successive parallel tracks across the width of the storage media, and
    recording partition format information at the next index location of the storage media in alternating media directions within successive parallel tracks across the width of the storage media.

23. A drive unit controller as defined in claim 22, wherein the controller central processing unit records information such that the first and second media recording directions extend along the length of the storage media.

24. A drive unit controller as defined in claim 22, wherein the index locations are at regularly spaced intervals along the length of the storage media.

25. A drive unit controller as defined in claim 22, wherein the storage media is a linear recording tape.

26. A drive unit controller comprising:
    a controller central processing unit; and
    a servo controller that moves drive unit heads relative to a storage media;
    wherein the controller central processing unit is programmed to control the servo controller unit and record partition format information at index locations on the storage media by performing method steps comprising:
    positioning the storage media at a first index location relative to recording heads, recording partition format information in a predetermined number of parallel tracks relative to the first index location of the storage media by alternately recording the partition format information in direct recording direction of a storage media track and then in an opposite, second recording direction in a parallel storage media track,
    moving the storage media in a first storage media direction to a next index location relative to the first index location, and
    repeating the steps of recording and moving until a predetermined extent of the storage media is recorded with partition format information.

27. A drive unit controller as defined in claim 26, wherein the step of recording includes moving the storage media at a recording speed past the recording heads; and the step of moving includes moving the storage media relative to the recording heads at a transport speed greater than the recording speed.

28. A drive unit controller as defined in claim 26, wherein the index locations are at regularly spaced intervals along the length of the storage media.

29. A drive unit controller as defined in claim 26, wherein the recording direction and the first storage media direction are parallel.

30. A drive unit controller as defined in claim 26, wherein the first index location comprises an end of media location, and the step of positioning comprises the steps of:
    initializing a position indicator that is moved a predetermined distance when the storage media is moved;
    maintaining a count of the position indicator movement as the storage media is moved from a beginning media location to the end of media location;
    determining the length of the storage media from the beginning media location to the end of media location in accordance with the count of the position indicator movement.

31. A drive unit controller as defined in claim 30, wherein the step of moving the storage media comprises determining an index location interval in accordance with the determined storage media length and moving the storage media in the first storage media direction a distance equal to the index location interval.

32. A drive unit controller comprising:
    a controller central processing unit; and
    a servo controller that moves drive unit heads relative to a storage media;
    wherein the controller central processing unit is programmed to control the servo controller and record partition format information on a linear storage media in a plurality of parallel tracks that extend lengthwise along the longitudinal dimension of the storage media by performing method steps comprising:
    determining a storage media length from a first media index location to a second media index location relative to the recording heads,
    positioning the second media index location at the recording heads,
    recording format information in alternate parallel tracks relative to the second storage media index location in a first storage media direction,
    positioning the storage media toward the first media location at a new media index location relative to the second media index location,
    recording format information in successive parallel tracks relative to the new media index location by alternately recording in the first storage media direction and then in a second storage media direction opposite that of the first storage media direction, in a parallel track, across the width of the storage media,
    repeating the steps of positioning the storage media and recording format information alternatingly in the first storage media direction and then in the second storage media direction until the storage media is positioned at the first media index location, and
    recording format information in alternate parallel tracks relative to the first storage media index location in the second storage media direction.

33. A drive unit controller as defined in claim 32, wherein the step of positioning the storage media toward the first media index location comprises determining an index location interval in accordance with the determined storage media length and positioning the storage media closer to the first media index location by the index location interval.

34. A drive unit controller as defined in claim 32, wherein the step of determining storage media length comprises the steps of:
 initializing a rotational position indication of a hub on which the storage media is wound;
 maintaining the rotational position indication as the storage media is moved from the first media index location to the second media index location; and
 determining the length of the storage media from the first media index location to the second media index location in accordance with the rotational position indication.

35. A drive unit controller as defined in claim 34, wherein the step of positioning the storage media toward the first media index location comprises the steps of:
 determining an index location interval in accordance with the determined storage media length; and
 moving the storage media closer to the first media index location until the rotational position indication increases by the amount of the index location interval.

36. A drive unit controller as defined in claim 32, wherein the positioning steps comprise moving the storage media at a high speed greater than a recording speed at which the storage media is moved during recording.

37. A drive unit controller as defined in claim 32, wherein the storage media comprises a tape storage device.

38. A storage subsystem comprising:
 a host computer;
 a drive unit that receives storage media, on which it records information received from the host computer with at least one recording head; and
 a drive unit controller that controls movement of the drive unit recording head relative to the storage media by performing method steps for recording partition format information on the storage media, the method steps comprising:
  recording partition format information in a first storage media track in a first media direction beginning at an index location of the storage media,
  recording partition information in a second storage media track, parallel to the first storage media track, in a second media direction opposite that of the first media direction,
  repeating the steps of recording in the first media direction and then recording in the second media direction in successive parallel tracks across the width of the storage media, and
  recording partition format information at the next index location of the storage media in alternating media directions within successive parallel tracks across the width of the storage media.

39. A storage subsystem as defined in claim 38, wherein the drive unit controller records information such that the first and second media recording directions extend along the length of the storage media.

40. A storage subsystem as defined in claim 38, wherein the index locations are at regularly spaced intervals along the length of the storage media.

41. A storage subsystem as defined in claim 38, wherein the storage media is a linear recording tape.

42. A storage subsystem comprising:
 a host computer;
 a drive unit that receives storage media, on which it records information received from the host computer with at least one recording head; and
 a drive unit controller that controls movement of the drive unit head relative to the storage media by performing method steps that record partition format information at index locations on the storage media, the method steps comprising:
  positioning the storage media at a first index location relative to the recording head, recording partition format information in a predetermined number of parallel tracks relative to the first index location of the storage media by alternately recording the partition format information in a first recording direction of a storage media track and then in an opposite, second recording direction in a parallel storage media track,
  moving the storage media in a first storage media direction to a next index location relative to the first index location, and
  repeating the steps of recording and moving until a predetermined extent of the storage media is recorded with partition format information.

43. A storage subsystem as defined in claim 42, wherein the step of recording includes moving the storage media at a recording speed past the recording head; and the step of moving includes moving the storage media relative to the recording head at a transport speed greater than the recording speed.

44. A storage subsystem as defined in claim 42, wherein the index locations are at regularly spaced intervals along the length of the storage media.

45. A storage subsystem as defined in claim 42, wherein the recording direction and the first storage media direction are parallel.

46. A storage subsystem as defined in claim 42, wherein the first index location comprises an end of media location, and the step of positioning comprises the steps of:
 initializing a position indicator that is moved a predetermined distance when the storage media is moved;
 maintaining a count of the position indicator movement as the storage media is moved from a beginning media location to the end of media location; and
 determining the length of the storage media from the beginning media location to the end of media location in accordance with the count of the position indicator movement.

47. A storage subsystem as defined in claim 46, wherein the step of moving the storage media comprises determining an index location interval in accordance with the determined storage media length and moving the storage media in the first storage media direction a distance equal to the index location interval.

48. A storage subsystem comprising:
 a host computer;
 a drive unit that receives linear storage media, on which it records information received from the host computer with at least one recording head; and
 a drive unit controller that controls movement of the drive unit head relative to the storage media to record partition format information on the linear storage media in a plurality of parallel tracks that extend lengthwise along the longitudinal dimension of the storage media by performing method steps comprising:

determining a storage media length from a first media index location to a second media index location relative to the recording head, positioning the second media index location at the recording head, recording format information in alternate parallel tracks relative to the second storage media index location in a first storage media direction, positioning the storage media toward the first media location at a new media index location relative to the second media index location, recording format information in successive parallel tracks relative to the new media index location by alternately recording in the first storage media direction and then in a second storage media direction opposite that of the first storage media direction, in a parallel track, across the width of the storage media, repeating the steps of positioning the storage media and recording format information alternatingly in the first storage media direction and then in the second storage media direction until the storage media is positioned at the first media index location, and recording format information in alternate parallel tracks relative to the first storage media index location in the second storage media direction.

49. A storage subsystem as defined in claim 48, wherein the step of positioning the storage media toward the first media index location comprises determining an index location interval in accordance with the determined storage media length and positioning the storage media closer to the first media index location by the index location interval.

50. A storage subsystem as defined in claim 48, wherein the step of determining storage media length comprises the steps of:

initializing a rotational position indication of a hub on which the storage media is wound;

maintaining the rotational position indication as the storage media is moved from the first media index location to the second media index location; and determining the length of the storage media from the first media index location to the second media index location in accordance with the rotational position indication.

51. A storage subsystem as defined in claim 50, wherein the step of positioning the storage media toward the first media index location comprises the steps of:

determining an index location interval in accordance with the determined storage media length; and moving the storage media closer to the first media index location until the rotational position indication increases by the amount of the index location interval.

52. A storage subsystem as defined in claim 48, wherein the positioning steps comprise moving the storage media at a high speed greater than a recording speed at which the storage media is moved during recording.

53. A storage subsystem as defined in claim 48, wherein the storage media comprises a tape storage device.

* * * * *